United States Patent
Lawson, Jr.

(10) Patent No.: US 7,597,160 B2
(45) Date of Patent: Oct. 6, 2009

(54) FOUR WHEEL DRIVE SYSTEM

(76) Inventor: Thomas Towles Lawson, Jr., 411 N. First St., Charlottesville, VA (US) 22902

( * ) Notice: Subject to any disclaimer, the term of this patent is extended or adjusted under 35 U.S.C. 154(b) by 316 days.

(21) Appl. No.: 11/467,674

(22) Filed: Aug. 28, 2006

(65) Prior Publication Data

US 2007/0051540 A1 Mar. 8, 2007

Related U.S. Application Data

(60) Provisional application No. 60/714,588, filed on Sep. 7, 2005.

(51) Int. Cl.
B62D 11/02 (2006.01)

(52) U.S. Cl. .................. 180/6.48; 180/252; 180/6.28; 180/6.44

(58) Field of Classification Search ............ 180/234, 180/242, 243, 6.44, 6.48, 307, 6.5, 65.1, 180/6.28, 254, 252; 446/460, 468
See application file for complete search history.

(56) References Cited

U.S. PATENT DOCUMENTS

| | | | |
|---|---|---|---|
| 2,994,392 A | 8/1961 | Kosman | |
| 3,827,517 A * | 8/1974 | Williamson | 180/6.48 |
| 3,972,379 A | 8/1976 | Norris | |
| 4,914,592 A | 4/1990 | Callahan | |
| 4,941,541 A | 7/1990 | Ito et al. | |
| 5,752,710 A | 5/1998 | Roberts | |
| 5,873,427 A * | 2/1999 | Ferguson et al. | 180/178 |
| 6,135,231 A * | 10/2000 | Reed | 180/308 |
| 6,425,453 B1 | 7/2002 | Knutson et al. | |
| 6,651,770 B2 | 11/2003 | Abend et al. | |
| 6,686,835 B2 | 2/2004 | Mase et al. | |
| 6,758,290 B2 * | 7/2004 | Jolliff et al. | 180/6.48 |
| 6,761,234 B1 | 7/2004 | Lamela et al. | |
| 6,957,731 B2 * | 10/2005 | Lawson, Jr. | 192/218 |
| 6,868,913 B2 | 11/2005 | Priepke | |
| 6,991,058 B2 * | 1/2006 | Cousin et al. | 180/242 |
| 7,040,425 B2 | 5/2006 | Hammonds | |
| 7,044,244 B2 | 5/2006 | Irikura | |
| 7,044,259 B2 | 5/2006 | Stoll et al. | |
| 7,059,433 B2 | 6/2006 | Hasegawa | |
| 7,111,704 B2 * | 9/2006 | Johnson | 180/307 |
| 7,152,709 B2 | 12/2006 | Jung | |
| 7,191,865 B2 * | 3/2007 | Spark | 180/411 |

(Continued)

OTHER PUBLICATIONS

Ingersoll Rand; Bobcat, The New K-Series, All-Wheel Steer Loader, A300; On-line specification materials; www.bobcat.com; pp. 1-6; printed Oct. 2006.

(Continued)

*Primary Examiner*—Tony H. Winner
(74) *Attorney, Agent, or Firm*—Lawrence E. Laubscher, Jr.

(57) ABSTRACT

A four wheel drive system for bilaterally symmetric vehicles is characterized by separate drive systems for the front and rear wheels. Each drive system is operable to independently drive each wheel. The rear wheels of the vehicle are steering wheels which are connected with the vehicle frame for independent rotation about a vertical axis. Steering and driving of the wheels is controlled by a controller. The combination of independent steering for the rear wheels and independent powering of all four wheels provides the vehicle with a zero turning radius for improved mobility as well as improved traction on unstable surfaces.

14 Claims, 3 Drawing Sheets

U.S. PATENT DOCUMENTS

| | | |
|---|---|---|
| 7,237,629 B1 | 7/2007 | Bland et al. |
| 2004/0079560 A1 | 4/2004 | Hammonds |
| 2004/0104056 A1 | 6/2004 | Perlick et al. |
| 2005/0070390 A1 | 3/2005 | Irikura et al. |
| 2005/0217906 A1 | 10/2005 | Spark |
| 2005/0236208 A1* | 10/2005 | Runkles et al. ............. 180/254 |
| 2006/0048975 A1 | 3/2006 | Irikura |
| 2006/0131097 A1 | 6/2006 | Lim et al. |

OTHER PUBLICATIONS

Kubota; GR Garden Tractors, GR2000/GR2100; On-line features literature; www.kubota.com; pp. 1-5; printed Oct. 2006.

Boomer Compact Tractors; SuperSteer FWD Axle; On-line features literature; www.newholland.com; p. 1; printed Oct. 2006.

Kubota; M Utility/Ag Tractors, M-110/M-120; On-line features literature; www.kubota.com; pp. 1-3; printed Oct. 2006.

Boomer TV145 Bidirectional Tractor; On-line features literature; www.newholland.com; p. 1; printed Oct. 2006.

* cited by examiner

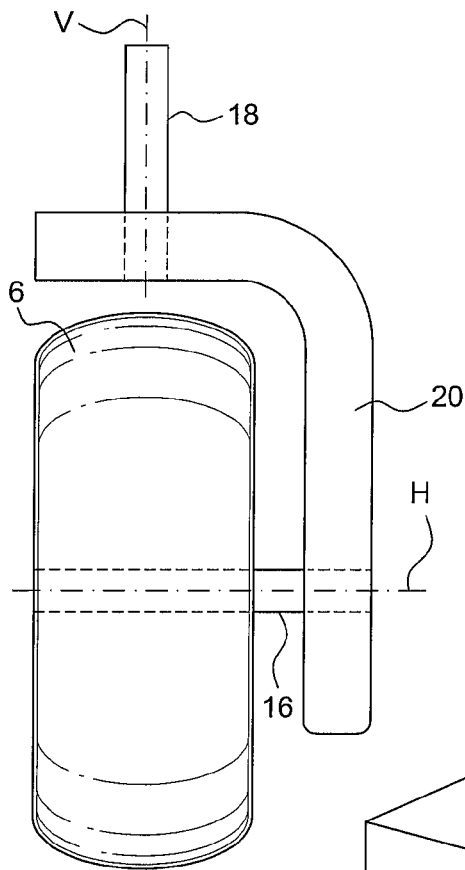
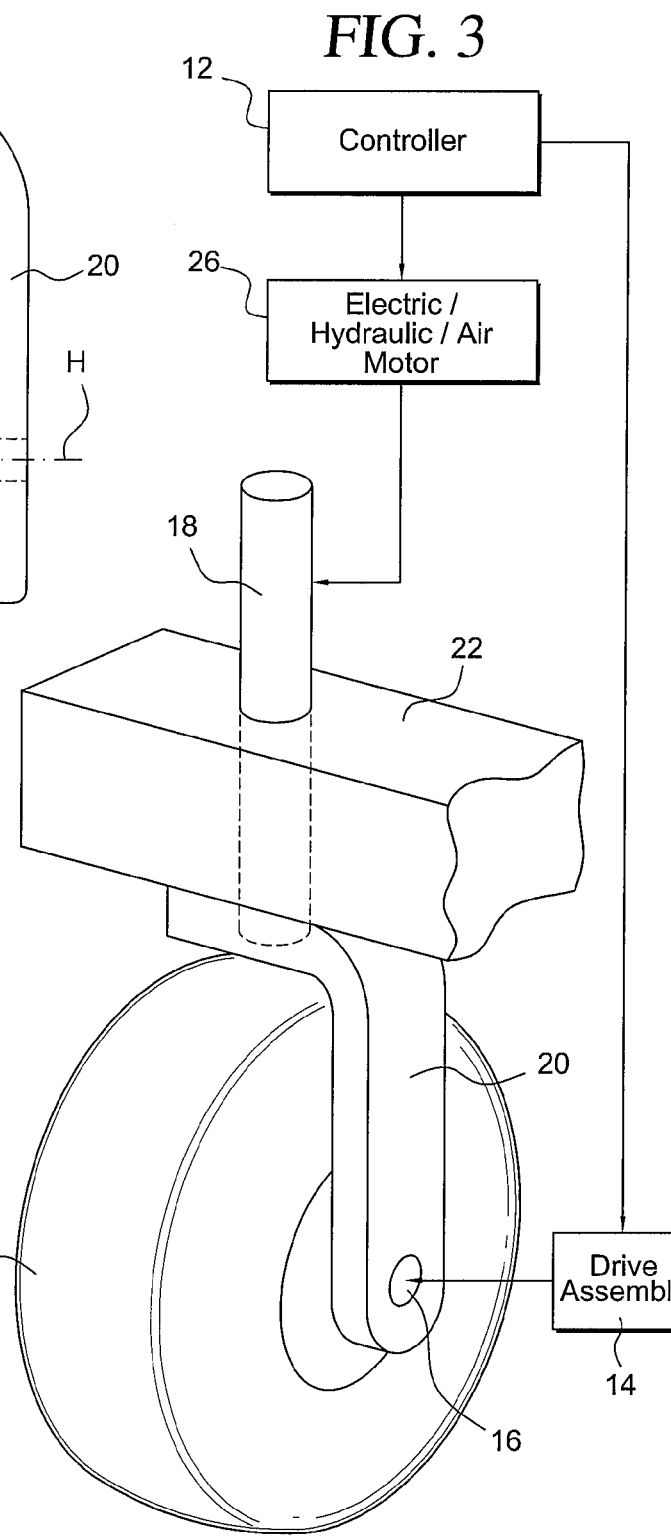
FIG. 2
FIG. 3

FOUR WHEEL DRIVE SYSTEM

This application claims the benefit of U.S. provisional application No. 60/714,588 filed Sep. 7, 2005.

BACKGROUND OF THE INVENTION

There has always been a trade off between traction and maneuverability in vehicles, particularly heavy equipment vehicles, tractors, and the like. Tractors were generally not considered for four wheel drive systems because it was believed that deliberate weight distribution and bilaterally independent brakes on the drive wheels would be sufficient for maximum tractive force. Moreover, there are difficulties in providing a driving force to the front steering wheels of such vehicles. If the steering wheels were given drive capability, it would be advantageous to make the steering wheels larger for greater traction. However, larger front steering wheels would interfere with the framework of the vehicle, thereby limiting their usefulness. In addition, conventional differentials required to drive the steering wheels are complex and expensive. With the advent of zero turning radius vehicles capable of turning in a reverse direction within the length of the vehicle, there is a greater need for improved traction. Some such vehicles have steering wheels which pivot about vertical axes in place of less directionally stable caster wheels. The present invention relates to zero turning radius vehicles in which the steering wheels are both driven and rotated about their vertical axes to control the steering and propulsion forces thereto.

BRIEF DESCRIPTION OF THE PRIOR ART

Various devices have been used to decrease the turning radius of four wheel drive tractors. Kubota uses a Bi-Speed turning mechanism wherein variable speeds are used for the front axle relative to the back. Kubota also manufactures a system where clutches are used in place of a differential between the rear wheels so that in tight turns, the system is practically a four wheel vehicle with the three outside wheels being driven. Others have used steerable axles where the entire axle pivots about its vertical axis. Other methods of decreasing turning radii while maintaining four wheel drive include four wheel steering, skid steering such as provided by Ingersoll Rand, and articulated steering. However, other than skid steering, none of these devices allow a zero turn radius. Moreover, the zero turning radius vehicles known in the art are not provided with four wheel drive because of the complexities of driving the steering wheels as set forth above. The present invention was developed in order to overcome these and other drawbacks of the prior devices by providing a four wheel drive vehicle which also has zero turning radius capabilities.

SUMMARY OF THE INVENTION

The four wheel drive system of the invention is suitable for use with bilaterally symmetrical vehicles having a pair of front wheels and a pair of rear wheels. Each of the rear wheels is connected with the vehicle for rotation about a vertical axis to provide steering for the vehicle. A first drive system independently rotates the front wheels about horizontal axes and a second drive system independently rotates the rear wheels about horizontal axes to propel the vehicle in forward and reverse directions. The second drive system further independently rotates the rear wheels about their vertical axes to steer the vehicle. The rear wheels can be turned through 360 degrees to provide the vehicle with a zero turning radius. A controller is connected with the first and second drive systems to control the operation thereof to propel and steer the vehicle in a desired direction. The controller is also preferably connected with each wheel to receive signals from the wheels corresponding to the horizontal rotation thereof and to the turning position of the rear wheels.

The drive systems comprise hydraulic pumps or motors. The second drive system includes two pumps, one for delivering a propulsion force to the rear wheels and another for delivering a steering force to the rear wheels.

In an alternate configuration, the first drive system for the front wheels includes a power source, a power splitter connected with the power source, and a pair of opposed drive mechanisms connected with the power splitter and the front wheels. Each drive mechanism includes a first differential clutch connected with the power splitter and a second differential clutch connected with the first differential clutch. First and second braking devices are connected between the first and second differential clutches to control the delivery of power from the power splitter to each wheel. Operation of the first and second braking devices controls the degree and direction of driving power being delivered from the power source to the wheels. In a preferred embodiment, hydraulic pumps act as the braking devices and appropriate valves and controls avoid the need for separate pumps.

BRIEF DESCRIPTION OF THE FIGURES

Other objects and advantages of the invention will become apparent from a study of the following specification when viewed in the light of the accompanying drawing, in which:

FIGS. 2 and 3 are front and perspective views, respectively, of one of the rear steering wheels of the vehicle;

DETAILED DESCRIPTION

Figure 1:
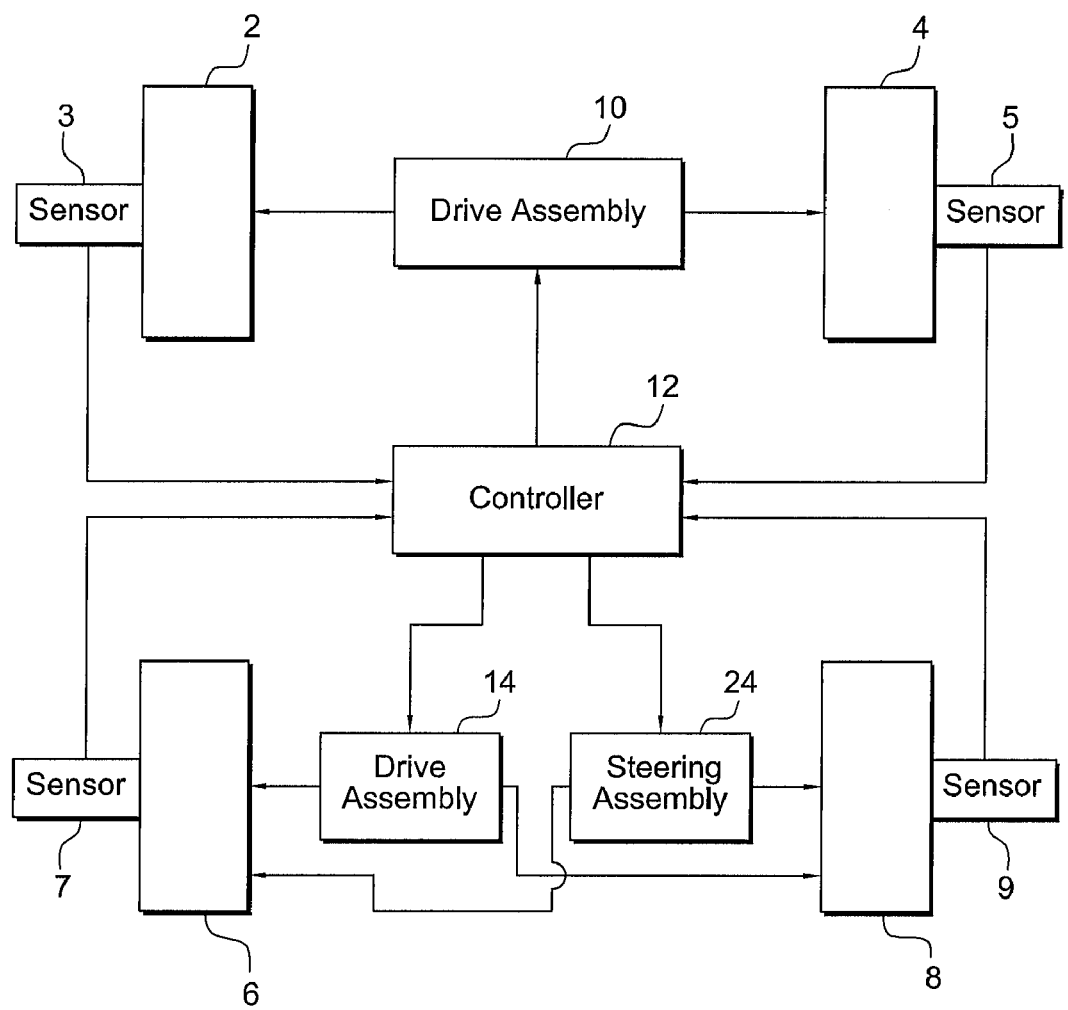
FIG. 1 is a schematic view of the four wheel drive system according to the invention.

Referring to FIG. 1, the four wheel drive system according to the invention will be described. The system is used to drive and steer a bilaterally symmetrical vehicle. Such vehicles include farm equipment, tractors, lawn mowers, and other types of heavy machinery which include front wheels 2, 4 and rear wheels 6, 8. A first drive system 10 is connected with the front wheels to independently rotate each wheel in forward or reverse directions about horizontal axes to propel the vehicle. The wheels have a fixed vertical axis relative to the vehicle and thus are not steerable except that limited steering is achieved by rotating the wheels 2 and 4 at different speeds or in different directions. A controller 12 is connected with the first drive system to control the delivery of drive power or force to the front wheels via the first drive system.

A second drive system 14 is connected with the controller and with the rear wheels 6 and 8 in order to independently rotate each wheel in forward or reverse directions about horizontal axes to propel the vehicle. Thus, the vehicle has four wheel drive capability under control of the controller 12 which assists the vehicle in traversing unstable ground.

Unlike the front wheels, the rear wheels 6, 8 are steering wheels. In order to accommodate steering thereof, the rear wheels are connected with the vehicle for rotation about a vertical axis. In FIGS. 2 and 3 is shown one of the rear wheels 6 which has a horizontal axis H which passes through the center of the axle 16 on which the wheel is mounted and a vertical axis V which passes through the center of a vertical shaft 18. The vertical shaft is connected at its lower end with a frame 20 which passes above and down the side of the wheel. The horizontal axle 16 is connected with the lower end of the frame. As shown more particularly in FIG. 3, the wheel vertical shaft 18 passes through the frame 22 of a vehicle and is rotatable with respect to the frame. This allows the wheel 6 to be rotated about its vertical axis V in order to steer the vehicle. Preferably, the wheel is rotatable through 360 degrees. The other rear wheel 8 is connected in the same manner as the wheel 6 to be steerable as well.

A steering system or assembly 24 is connected between the controller 12 and the rear wheels 6 and 8 as shown in FIG. 1. The steering system is operable to independently rotate the wheels about their vertical axes. Because the rear wheels are rotatable through 360 degrees, the vehicle has a zero turning radius which allows it to turn around within its length. Referring to FIG. 3, the steering system for each wheel includes a motor 26 is operated by the controller 12 to rotate the vertical shaft 18 to turn the associated steering wheel 6. The motor can be an electric motor, a hydraulic motor, or an air motor as will be appreciated by those of ordinary skill in the art. According to a preferred embodiment of the invention as shown in FIG. 3, the motor 26 comprises a hydraulic pump. The controller controls valves (not shown) between the pump 26 and the vertical shaft 18 to control the delivery of hydraulic fluid to the shaft to rotate the shaft in opposite directions. Thus each of the steerable rear wheels 6, 8 includes a horizontal drive 14 for propulsion and a vertical drive assembly 24 for steering.

Each wheel includes a conventional sensor 3, 5, 7, 9 connected with the controller 12 to provide feedback signals as is known in the art which indicate the direction and speed of horizontal rotation of each wheel as well as the rotational position of the rear wheels with respect to their vertical axes. The feedback signals can be used to override certain inputs to the controller by the operator of the vehicle to prevent the vehicle from being driven in a dangerous manner. For example, as the forward speed of the vehicle increases, the turning radius of the vehicle is increased to prevent the vehicle from tipping over by turning too sharply at high speed.

Figure 4:
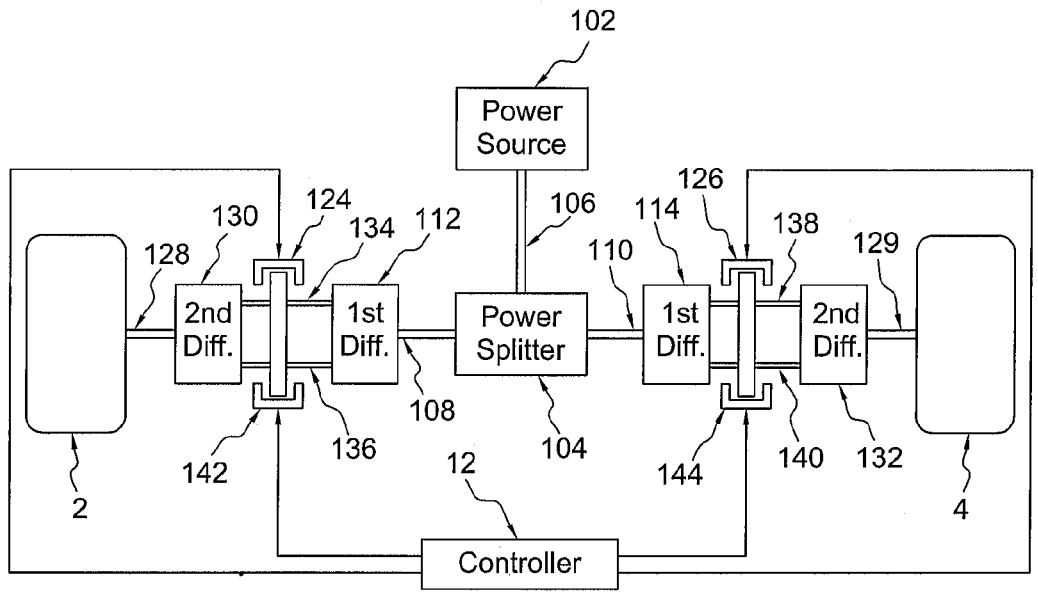
FIG. 4 is a schematic view of a preferred drive system for the front wheels of the vehicle.

A preferred drive system for the front wheels of the vehicle is shown in FIG. 4. This drive system is disclosed in U.S. Pat. No. 6,957,731. The driving system of FIG. 4 includes a power source 102 connected with a power splitter 104 via a drive shaft 106. The power splitter includes output shafts 108 and 110, which are connected to the first differential clutches 112 and 114, respectively. First differentials 112 and 114 have a single input which receives power from the output shafts 108, 110 from the power splitter, and two outputs, which are connected to second differentials 130, 132 via their respective output shafts. More particularly, output shafts 134 and 136 connect first differential 112 to the second differential 130, while output shafts 138 and 140 connect first differential 114 to second differential 132. Output shafts 134, 138 rotate in a first direction, while output shafts 136, 140 rotate in the opposite direction. Second differentials 116, 118 have two inputs and a single output. Because the splitter delivers the same output to the differential clutches, the drive system is bilaterally symmetrical.

Each second differential clutch has an output drive shaft 116, 118 connected with a wheel 2, 4. The operation of each differential clutch is individually controlled by braking devices 124, 126, 142, and 144. The braking devices may be of any conventional type including pumps or generators. Braking action from one of the braking devices slows or stops the rotation of the corresponding shaft spinning in a first direction and engages the differential clutch of the first differential shaft with which it is connected, thereby allowing power to be transmitted to the output shaft rotating in the opposite direction. The rotating shaft transmits power turning the other output shaft which is also connected to the second differential. Because the braking devices are controlled independently via the controller 12 by the operator, the amount of driving force applied to each wheel from the power source can be controlled to propel the wheel in a forward or reverse direction as well as to provide coordinated steering of the vehicle.

For example, if braking elements 124, 126 are engaged, power from the power source is transmitted to second differential clutches 130, 132 by output shafts 136 and 140, respectively, thereby facilitating reverse motion. If braking elements 142, 144 are engaged, power from the power source is transmitted to second differential clutches 130, 132 by output shafts 134 and 138, respectively, thereby providing forward motion.

To execute a right turn, braking elements 142, 126 are engaged, thereby causing power from the power source to transmit to second differential clutches 130, 132 by output shafts 134 and 140, respectively, thereby facilitating a zero-radius turn to the right. A zero-radius left turn is accomplished by engaging braking elements 124 and 144.

Figure 5:
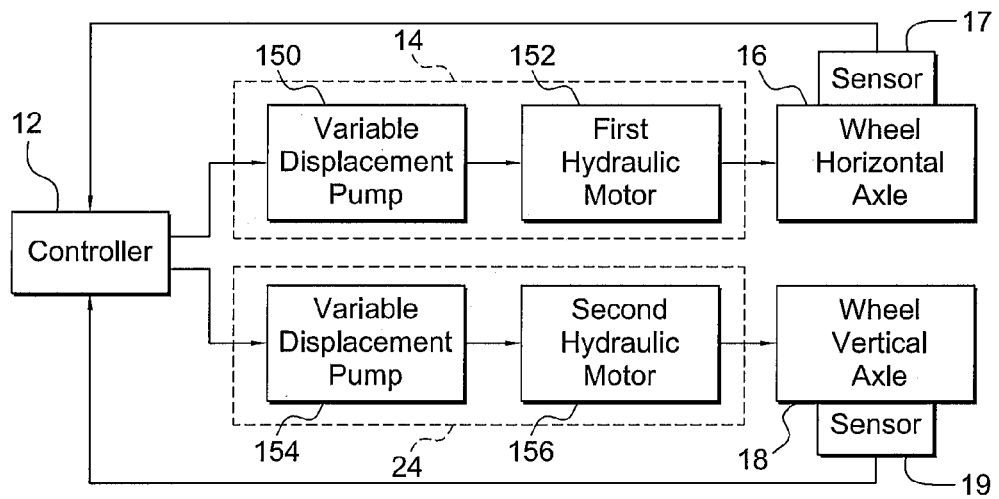
FIG. 5 is a schematic view of a preferred drive system for the rear wheels of the vehicle.

The preferred drive and steering systems for each of the rear steering wheels 6 and 8 will be described with reference to FIG. 5. The drive system 14 for each steering wheel includes a first variable displacement pump 150 connected with the controller which feeds hydraulic fluid to a first hydraulic motor 152 which in turn is connected with the horizontal axle 16 of one of the rear wheels. The connection would be via the wheel frame 20. The steering system 24 for each rear steering wheel includes a second variable displacement pump 154 which feeds hydraulic fluid to a second hydraulic motor 156 which is connected with the vertical axle 18 of the wheel under control of the controller. The first hydraulic motor 152 actuates the horizontal axle to drive the wheel forward or backward. The second hydraulic motor 156 actuates the vertical axle to turn the wheel left or right. Feedback signals are sent from conventional sensors 15, 17 on the horizontal 16 and vertical 18 axles, respectively, to the controller 12 as is known in the art.

Vertical axis rotation is achieved by indexing the second hydraulic motor 156. An encoder sends a signal to the controller 12 so that the controller knows the angle at which each of the rear wheels is pointing. With such an arrangement, the rear wheels can rotate about their vertical axes to a much greater angle than traditional traction or steering wheels.

Hydraulic motors can also be used to independently drive the front wheels 2 and 4 in place of the drive system shown in FIG. 4. The motors would be supplied by a variable displacement pump under control of the controller in a manner similar to the horizontal axle drive system of FIG. 5 for the rear wheels. In addition, each of the drive and steering motors may comprise electric or pneumatic motors as is known in the art.

In operation, an operator can use a joystick, not shown, to provide input to the controller which is used to propel and steer the vehicle. If the operator pushes the joystick all the way to the left, the vehicle would sit still but the rear wheels will rotate about their vertical axes and would be pointed at 90 degrees to the direction of the front wheels and also therefore 90 degrees to where the machine is facing. If the operator then moved the joystick forward, still holding it all the way to the left, the vehicle would begin making a very sharp left hand turn. The right front wheel would roll forward, and the left front wheel would roll backward, both under power. The rear wheels would drive forward, that is, they would push the rear of the vehicle to the right at a right angle to where the vehicle is facing. If the operator then pulls the joystick backwards, still with the joystick all the way to the left, the left front wheel 2 would be driven forward and the right front wheel 4 would be driven in reverse.

The rear wheels would not change relative to their vertical axes, but their horizontal rotation would be reversed. If the drive system for the front wheels is of the type shown in FIG. 4, the pumps which are used in place of brakes can be used to provide the hydraulic oil to drive the rear wheels. A valve is integrated into the system so that the oil goes in the proper direction past the wheel motors on the rear wheels.

While the preferred forms and embodiments of the invention have been illustrated and described, it will be apparent to those of ordinary skill in the art that various changes and modifications may be made without deviating from the inventive concepts set forth above.

What is claimed is:

1. A four wheel drive system for a bilaterally symmetrical vehicle having pairs of front and rear wheels, respectively, comprising
   (a) a first drive system for independently rotating each of the front wheels in forward and reverse directions about a horizontal axis to propel the vehicle;
   (b) a second drive system for independently rotating each of the rear wheels about a horizontal axis at similar speeds in the same direction to propel the vehicle;
   (c) said rear wheels further being connected with said vehicle for rotation about vertical axes, respectively, beyond 180 degrees;
   (d) a third drive system independently rotating the rear wheels about vertical axes to steer the vehicle; and
   (e) a controller connected with said first, second and third drive systems for controlling the operation thereof to steer and propel the vehicle, said controller operating said first drive system to simultaneously rotate said front wheels in opposite directions when executing a sharp turn approaching a turning radius of zero.

2. A four wheel drive system as defined in claim 1, wherein each wheel includes a sensor for producing signals relating to the rotational speed of the all of the wheels and the position of the rear wheels relative to the vertical axes, said controller being connected with said wheel sensors, whereby said controller may compensate for wheel speed not provided by the operator input.

3. A four wheel drive system as defined in claim 1, wherein at least one of said first and second drive systems comprises
   (a) a power source;
   (b) a power splitter connected with said power source; and
   (c) a pair of opposed drive mechanisms connected with said power splitter and the wheels, each drive mechanism including
      (1) a first differential clutch connected with said power splitter and a second differential clutch connected with said first differential clutch; and
      (2) first and second braking devices connected between said first and second differential clutches to control the delivery of power from said power splitter to the wheel, whereby operation of said first and second braking devices controls the degree and direction of driving power being delivered from said power source to the wheels.

4. A four wheel drive system as defined in claim 1, wherein at least one of said first, second and third drive systems comprises one of an electric motor, a hydraulic motor, a pneumatic motor, a pump, an alternator, a generator, and a mechanical drive.

5. A four wheel drive system as defined in claim 4, wherein said motors comprise hydrostatic pumps and hydraulic motors.

6. A four wheel drive system as defined in claim 5, and further comprising a variable displacement pump connected between said controller and said hydraulic motor.

7. A four wheel drive system as defined in claim 4, wherein said second drive system comprises first pumps connected with first hydraulic motors for delivering power to the horizontal axles, respectively, of each of the rear wheels for propulsion and said third drive system comprises second pumps connected with second hydraulic motors for delivering power to the vertical axes, respectively, of each of the rear wheels for steering.

8. A steering mechanism for a vehicle, comprising
   (a) a pair of axles;
   (b) a pair of wheels connected with said axles for driven rotation about horizontal axes, respectively, said wheels further being actively rotatable through greater than 180 degrees about vertical axes with respect to said axles;
   (c) a first drive system connected with the front wheels to drive said wheels in forward and reverse directions about said horizontal axes and a second drive system connected with said pair of wheels to independently rotate said wheels about said vertical axes; and
   (d) a controller connected with said first and second drive systems for controlling the operation thereof to steer and propel the vehicle in accordance with operator input to said controller, said controller operating said first drive system to simultaneously rotate said front wheels in opposite directions when executing a sharp turn approaching a turning radius of zero.

9. A four wheel drive system for a bilaterally symmetrical vehicle having a longitudinal axis and pairs of front and rear wheels, respectively, comprising
   (a) a propelling drive system for rotating each of the front wheels in forward and reverse directions about a horizontal axis to propel the vehicle, said drive system further rotating each of the rear wheels about a horizontal axis at similar speeds in the same direction to propel the vehicle;
   (b) the rear wheels further being connected with said vehicle for rotation about vertical axes, respectively;
   (c) a steering drive system for rotating the rear wheels about vertical axes up to 90° relative to said vehicle longitudinal axis to steer the vehicle; and
   (e) a controller connected with said propelling and steering drive systems for controlling the operation thereof to propel and steer the vehicle, said controller operating said propelling drive system to simultaneously rotate said front wheels in opposite directions when executing a sharp turn approaching a turning radius of zero.

10. A four wheel drive system as defined in claim 9, wherein said propelling drive system comprises a first drive system for said front wheels and a second drive system for said rear wheels.

11. A four wheel drive system as defined in claim 10, wherein said first drive system rotates each of said front wheels independently.

12. A four wheel drive system as defined in claim 10, wherein said second drive system rotates each of said rear wheels independently.

13. A four wheel drive system as defined in claim 9, wherein said steering drive system rotates the rear wheels independently about vertical axes, respectively.

14. A four wheel drive system as defined in claim 9, wherein each wheel includes a sensor for producing signals relating to the rotational speed and rotational direction of the wheels and the position of the wheels relative to the vertical axes, said controller being connected with said wheel sensors, whereby said controller may compensate for wheel speed not provided by the operator input.

* * * * *